(12) United States Patent
Kono

(10) Patent No.: US 7,565,013 B2
(45) Date of Patent: Jul. 21, 2009

(54) CHARACTER RECOGNITION METHOD, METHOD OF PROCESSING CORRECTION HISTORY OF CHARACTER DATA, AND CHARACTER RECOGNITION SYSTEM

(75) Inventor: Masataka Kono, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 935 days.

(21) Appl. No.: 11/177,681

(22) Filed: Jul. 7, 2005

(65) Prior Publication Data
US 2006/0013484 A1  Jan. 19, 2006

(30) Foreign Application Priority Data
Jul. 15, 2004  (JP)  ............... 2004-207985

(51) Int. Cl.
*G06K 9/00*  (2006.01)
(52) U.S. Cl. ........................................ 382/181
(58) Field of Classification Search ............ None
See application file for complete search history.

(56) References Cited

U.S. PATENT DOCUMENTS

| 6,035,062 A | 3/2000 | Takasu et al. |
| 6,456,739 B1 * | 9/2002 | Ikeda .................. 382/177 |

FOREIGN PATENT DOCUMENTS

| EP | 0539739 A2 | 5/1993 |
| EP | 0539739 A3 | 5/1993 |
| EP | 0565871 A2 | 10/1993 |
| EP | 0750270 A2 | 12/1996 |
| EP | 0750270 A3 | 12/1996 |
| JP | 0565871 A3 | 10/1993 |
| JP | 07-049924 | 2/1995 |

OTHER PUBLICATIONS

European Patent Office (EPO) Search for EPO patent application EP05015158 (Nov. 28, 2008).

* cited by examiner

*Primary Examiner*—Matthew C Bella
*Assistant Examiner*—Alex Liew
(74) *Attorney, Agent, or Firm*—Townsend and Townsend and Crew LLP (57) ABSTRACT

A handwritten character of each writer may have two or more characteristics and the characteristics are not always identical to those of a character in a correction history registered in the past. Thus, handwritten characters may not be recognized only by conventional character recognition. In the present invention, correction history data in which an identifier of a handwriting input device (device ID) used by a writer, image data on a handwritten character, and a character recognition code are associated with one another is managed in chronological order. Handwritten character images of the same writer and the same character code are extracted from the correction history data in chronological order starting from the latest image and the characteristics of the character images are detected, so that the characteristics of handwriting of a person are extracted.

4 Claims, 9 Drawing Sheets

CHARACTER RECOGNITION METHOD, METHOD OF PROCESSING CORRECTION HISTORY OF CHARACTER DATA, AND CHARACTER RECOGNITION SYSTEM

CLAIM OF PRIORITY

The present application claims priority from Japanese patent application serial no. 2004-207985, filed on Jul. 15, 2004, the content of which is hereby incorporated by reference into this application.

BACKGROUND OF THE INVENTION

1. Field of the Invention

The present invention relates to a character recognition method of recognizing characters from character image data obtained by an input device, a method of processing the correction history of character data, and a character recognition system. The present invention particularly relates to a character recognition method for improving a character recognition rate, a method of processing the correction history of character data, and a character recognition system.

2. Description of Related Art

Japanese Laid-Open Patent Publication No. Hei 7-49924 discloses character recognition method in which a correction history is used to eliminate the workload of an operator who repeatedly inputs similar corrections every time a machine erroneously recognizes the same character written in a way unique to a writer (a peculiar way of writing).

The invention described in Japanese Laid-Open Patent Publication No. Hei 7-49924 provides, as a method of recognizing handwritten characters, a correction history edited for each writer of handwritten characters. When code data determined by a machine is corrected by an operator, additional information including the correction is stored in the correction history. Character recognition means refers to the correction history as well as a character dictionary to determine code data.

In Japanese Laid-Open Patent Publication No. Hei 7-49924, regarding a character corrected as a character recognition result, code data and the like of other candidate characters obtained in a character recognition process are displayed on a display device in response to a request from an operator, so that the workload of the operator is reduced.

However, a handwritten character of each writer may have two or more characteristics. Further, the characteristics of a current handwritten character are not always identical to those of the character in the correction history registered in the past. For this reason, some characters may not be recognized in the character recognition of Japanese Laid-Open Patent Publication No. Hei 7-49924.

SUMMARY OF THE INVENTION

The present invention provides a character recognition method and a character recognition system whereby the characteristics of a handwritten character image of each writer can be captured more faithfully and handwriting characteristics varying among writers can be captured.

In the present invention, correction history data is managed in chronological order. In the correction history data, an identifier (device ID) of a handwriting input device used by a writer, the image data on a handwritten character, and a character code are associated with one another. Then, handwritten character images of the same writer and the same character code are extracted in chronological order starting from the latest image, and the characteristics of the character images are detected, so that the characteristics of the handwriting of a person are extracted. The correction history data and character image data required for basic character conversion are separately managed and used for character recognition.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Figure 1:
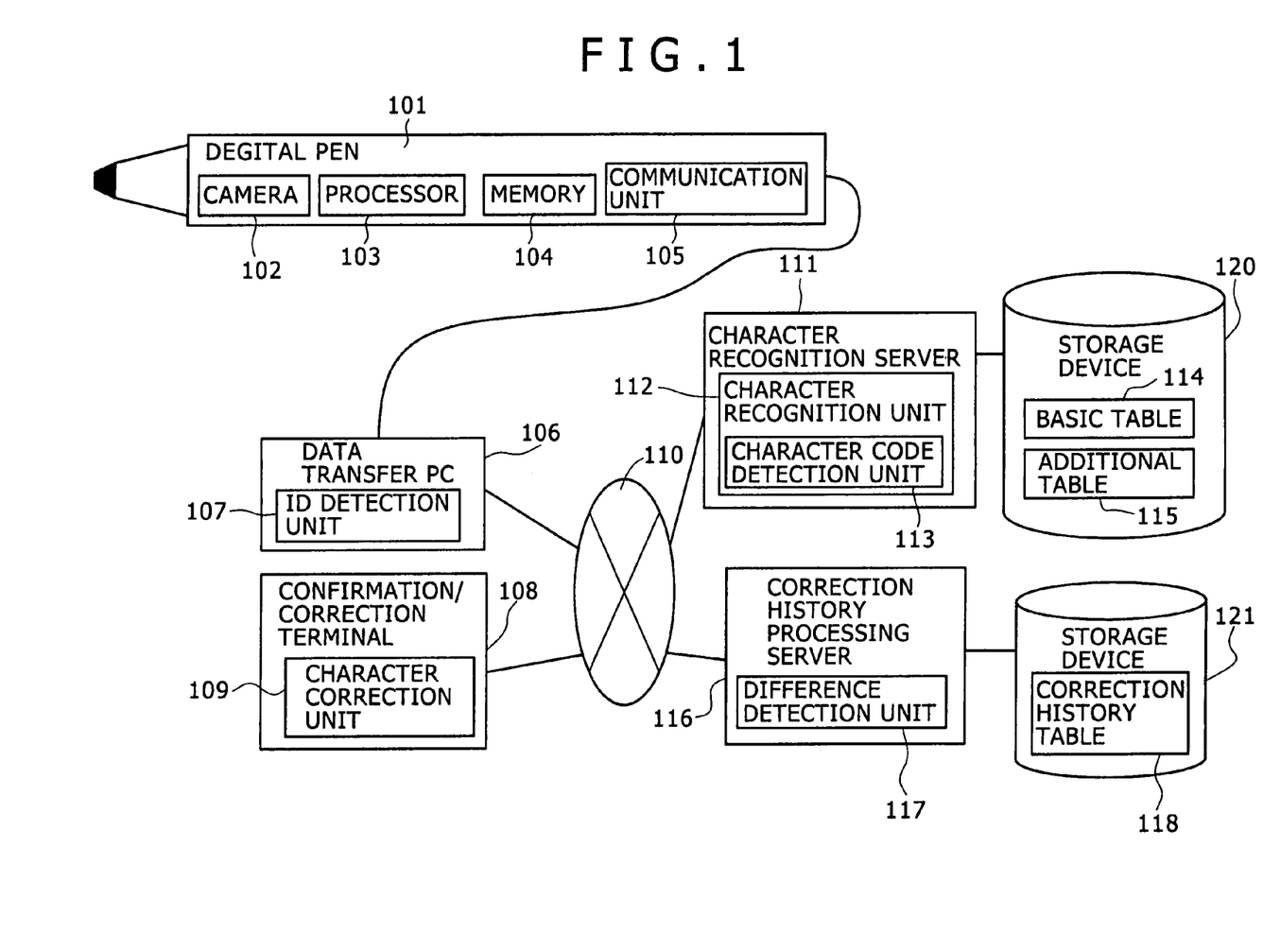
FIG. 1 is a block diagram for explaining the configuration of a character recognition system.

FIG. 1 is a block diagram for explaining the configuration of a character recognition system. Referring to FIG. 1, the following will describe the transmission and reception of data inputted from a digital pen and the recognition of image data in a computer.

A digital pen 101 is constituted of a camera 102, a processor 103, a memory 104, and a communication unit 105. The communication unit 105 is constituted of software and hardware for communication with a data transfer PC 106 through wire. The processor 103 transmits and receives data stored in the memory 104 and performs various kinds of data processing. The digital pen has an identifier making it possible to uniquely identify each digital pen.

When a user writes a character or draws on a paper sheet, on which a dot pattern has been printed, with the digital pen 101, the digital pen 101 samples the character or drawing with the camera 102 in a fixed sampling cycle and converts information about the handwritten character or drawing of the user into digital data (a trail of the pen (coordinate position data on the handwritten character on the paper sheet), a handwriting pressure, sampling time information), and the data is stored in the memory 104 of the digital pen 101.

Ordinarily the digital pen 101 is not connected to the data transfer PC 106 and thus a cable is not connected to the digital pen 101. When the digital pen 101 is connected to the data transfer PC 106, position coordinate data stored in the memory 104 of the digital pen 101 is transmitted from the communication unit 105 of the digital pen 101 and received by the data transfer PC 106. The data transfer PC 106 converts the position coordinate data to character data and transmits the data to a character recognition server 111 through a network 110. The character recognition server 111 performs character recognition on the received character data.

The data transfer PC 106 has an interface for receiving data from the digital pen 101. Various I/O devices, a storage device, and a processor which are equipped in the data transfer PC 106 are not shown in FIG. 1. In the data transfer PC 106, a device driver for processing data transmitted from the digital pen 101 and programs such as an operating system are operated. The data transfer PC 106 converts data received from the digital pen 101 to character image data, stores the data in the storage device of the data transfer PC 106, and transmits the data to the character recognition server 111.

The character recognition server 111 receives character data processed in the data transfer PC 106 and performs character recognition on the character data received in a character recognition unit 112 operating in the character recognition server 111.

The camera 102 included in the digital pen 101 recognizes a dot pattern, which is printed on a paper sheet, at a sampling frequency of several tens Hz, and recognizes coordinate position information (X and Y coordinates) and the like about a character or drawing drawn with the digital pen. The coordinate position data and the pen ID of the digital pen are transmitted through the communication unit 105.

Further, the digital pen 101 has a pressure sensor. Data input to the digital pen and data transmission may be triggered according to contents detected by the pressure sensor. For example, when the pressure sensor recognizes that the digital pen is pressed to the paper sheet, the digital pen is switched on to start inputting handwritten data. Conversely, when the pressure sensor recognizes that the digital pen is separated from the paper sheet, the communication unit 105 of the digital pen 101 transfers the position coordinate data stored in the memory 104 to the PC 106 or the character recognition server 111. The digital pen is switched off after the data is transferred from the memory included in the digital pen, so that a series of operations are completed.

In the character recognition server 111, a character code detection unit 113 is operated, which is a program for detecting a character code in the character recognition unit 112 for performing character recognition. If necessary, the character code detection unit 113 makes an addition, an update, and a reference to information included in a basic table 114 and an addition table 115 stored in a storage device.

In a correction history processing server 116, a program for managing the correction history of character data is operated. The correction history processing server 116 extracts necessary data from a correction history table 118, in which the correction history of characters is stored, and performs difference detection.

The processing of the character recognition server 111 and the correction history processing server 116 and the contents of each table will be discussed in detail later.

In a confirmation/correction terminal 108, a character correction unit 109 operates, which is a program for receiving character image data and handwritten image data and performing data processing. An operator uses the confirmation/correction terminal 108 to check the contents of data transmitted from the character recognition server 111 to the confirmation/correction terminal 108 and correct, when necessary, character data transmitted from the character recognition server 111. The confirmed data and corrected data are transmitted from the confirmation/correction terminal 108 to the correction history processing server 116.

The data corrected in the confirmation/correction terminal 108 is transmitted to the character recognition server 111 and the correction history processing server 116.

The outline of character recognition will be discussed below.

The ID detection unit 107 detects the identifier of the digital pen (digital pen ID) from the received data. Further, the data transfer PC 106 extracts character image data (data on X and Y coordinates recognized from a character in a dot pattern) from position coordinate data received from the digital pen 101. These data pieces are transmitted to the character recognition server 111. In the character recognition unit 112 of the character recognition server 111, character codes are recognized using various tables. The detail of this processing will be discussed later in accordance with FIG. 2.

In a storage device 120 connected to the character recognition server 111, a basic table 114 and an additional table 115 are recorded. The basic table 114 is a table where character images and character codes are associated with each other. The basic table 114 stores image data on basic characters and is shared among all digital pen IDs.

On the other hand, the additional table 115 is a table where new images and character codes are associated with each other regarding the correction history of characters which have failed to be recognized during the character recognition of handwritten image data. The additional table 115 extracts necessary information from a correction history table and manages data on difference detection results in relation to the pen IDs.

In a storage device 121 connected to the correction history processing server 116, the correction history table 118 is recorded. The correction history table 118 is a table for storing data corrected by the operator in the confirmation/correction terminal 108. A difference detection unit 117 of the correction history processing server 116 extracts data required to recognize corrected characters from the correction history table 118, and data subjected to difference detection is stored in the additional table 115. The correction history data of the correction history table 118 is also managed in relation to the pen IDs.

The following will describe the outline of data flow in the character recognition server 111, the correction history processing server 116, and the confirmation/correction terminal 108.

Data (data in which coordinate position information about handwritten data and pen IDs are associated with each other) transmitted from the digital pen 101 is transmitted to the character recognition server 111 through the data transfer PC 106. In the data transfer PC 106, the data in which the coordinate position data and the pen IDs are associated with each other is converted to data in which character image data and the pen IDs are associated with each other, and transmitted to the character recognition server 111. The character recognition server 111 transmits, to the confirmation/correction terminal 108, the data (the character image data and the pen IDs) transmitted from the data transfer PC 106 and data on character recognition results.

To be specific, (1) two or more users fill in medical charts and various input forms by using digital pens. (2) Then, a number of handwritten data pieces are transmitted from the digital pens to the data transfer PC 106. The data is converted in the data transfer PC 106. The converted data is transmitted to the character recognition server 111. (3) In the character recognition server 111, character recognition is performed using the basic table 114 and the additional table 115 having two or more digital pen IDs. (4) Data on character recognition results obtained in the character recognition server 111 is transmitted to the confirmation/correction terminal 108. (5) Two or more operators check whether the data transmitted from the character recognition server 111 includes character recognition errors while sharing the load, by using the confirmation/correction terminals 108.

A character correction unit 109 of the confirmation/correction terminal 108 transmits corrected data and the like with a pen ID from the confirmation/correction terminal 108 to the correction history processing server 116.

The correction history processing server 116 stores the data transmitted from the confirmation/correction terminal 108 with the pen ID in the correction history table 118. Results of processing in the correction history processing server 116 are transmitted to the character recognition server 111 and the results are stored in the additional table 115. This processing will be specifically described in difference detection shown in FIG. 3.

The camera 102 may be an optical sensor (an element for recognizing light, an infrared sensor, an element for identifying carbon, etc.) when necessary. The communication unit may be connected to the data transfer PC through Bluetooth radio communication and the like. Although the digital pen is described as an example of an input device, other input devices may be used as long as the input devices have unique identifiers. The data transfer PC 106 and the character recognition server 111 may be computers, machines specifically designed for the above-described processing, or other kinds of machines. Position coordinate data may be converted to character image data in the character recognition server 111. The character recognition server 111 and the correction history processing server 116 may be constituted of the same computer. Data corrected in the confirmation/correction terminal 108 may be transmitted to one of the character recognition server 111 and the correction history processing server 116.

Figure 2:
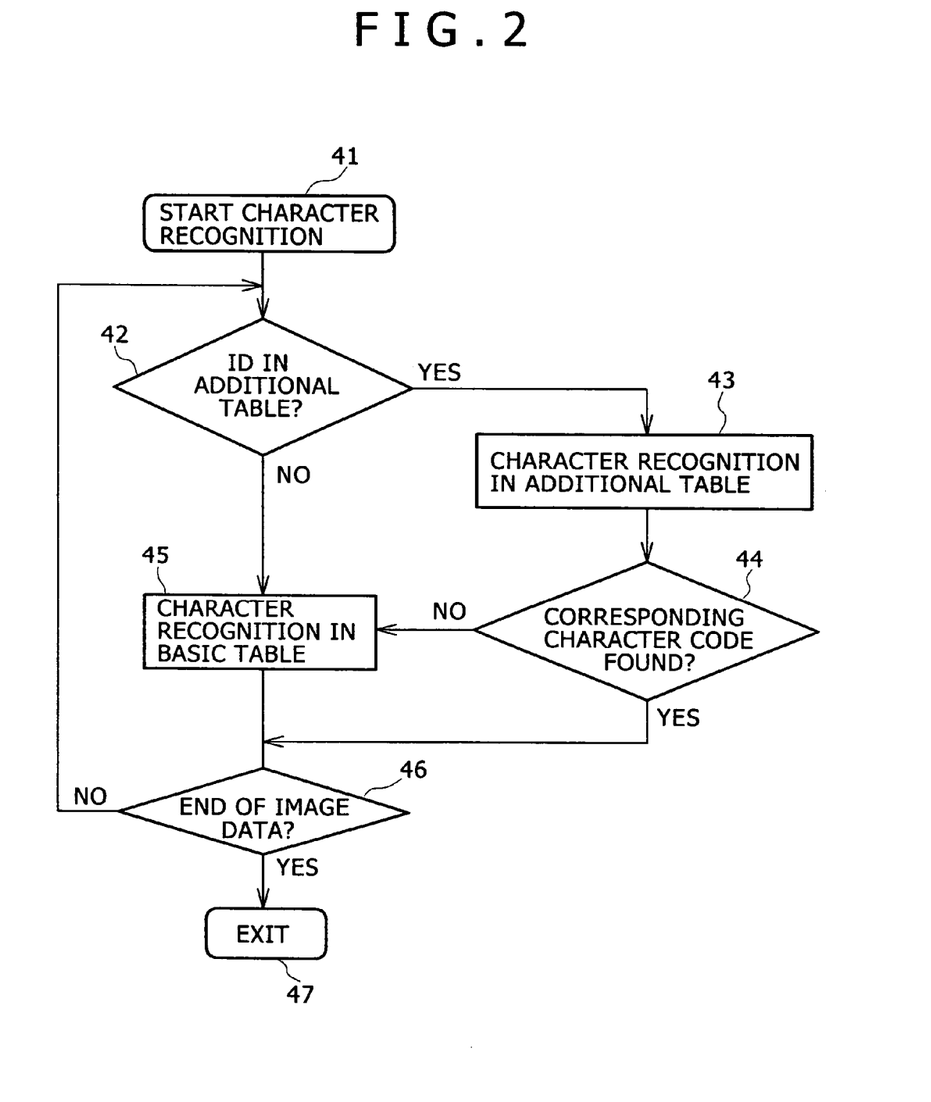
FIG. 2 is a flowchart for explaining the procedure of character recognition.

FIG. 2 is a flowchart for explaining the procedure of character recognition.

In step 41, character recognition is started when character image data and a digital pen ID are received from the data transfer PC 106.

In step 42, the character recognition unit 112 of the character recognition server 111 extracts the pen ID from the received data and identifies the pen ID. To be specific, the character recognition unit 112 decides whether the pen ID is present in the additional table. When the pen ID is present in the additional table 115, the process advances to step 43. When the pen ID is not present in the additional table 115, the process advances to step 45.

In step 43, the character recognition unit 112 performs character recognition using the additional table 115, and then the process advances to step 44.

Instep 44, the character code detection unit 113 decides whether the additional table 115 has a character code corresponding to character image data received by the character recognition server 111. When the character code detection unit 113 decides that the additional table 115 has the character code, the character image data is converted to text based on the additional table 115, and then the process advances to step 46. When the character code detection unit 113 decides that the additional table 115 does not have any character corresponding to the image data, the process advances to step 45.

In step 45, in response to the decision result obtained by the character code detection unit 113 that the additional table 115 does not have the character code, the character recognition unit 112 performs character recognition on the character image data based on the basic table 114, and then the process advances to step 46.

In step 46, it is confirmed that the character image data is recognized. When subsequent character image data is present, the processing from step 42 is repeatedly performed on the subsequent character image data. When subsequent character image data is absent, the data subjected to character recognition is stored and the processing is completed.

Figure 8:
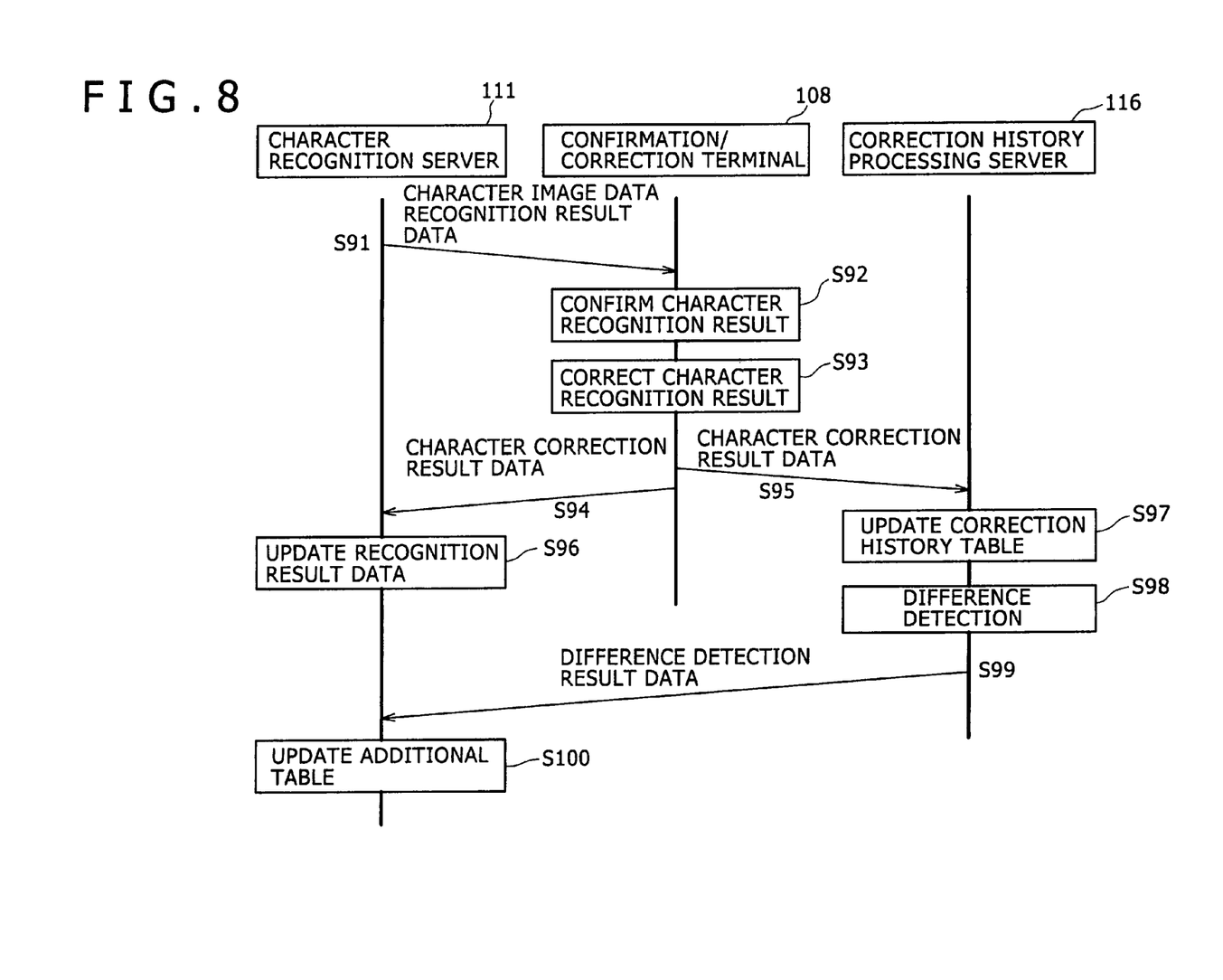
FIG. 8 is a sequence diagram for explaining communications and processing among a character recognition server, the confirmation/correction terminal, and a correction history processing server.

Referring to FIG. 8, the following will discuss the flow of processing in the character recognition server, the confirmation/correction terminal, and the correction history processing server. FIG. 8 is a sequence diagram for explaining communications and processing among the character recognition server, the confirmation/correction terminal, and the correction history processing server.

In FIG. 8, for example, when about a single A4 page of data is recognized by the character recognition server 111, the character recognition server 111 adds recognition result data obtained by the character recognition server 111 to pen IDs and character image data, and transmits the data to the confirmation/correction terminal 108 (S91). The confirmation/correction terminal 108 having received the character image data and the recognition result data displays the data on the screen while establishing correspondences between the data. The operator of the confirmation/correction terminal 108 compares the displayed character image data with the recognition result data (S92) and corrects character recognition results (S93). When all confirmations are completed, the confirmation/correction terminal 108 transmits the pen IDs and character correction result data to the character recognition server 111 and the correction history processing server 116 (S94, S95).

The character recognition server 111 having received the pen IDs and the character correction result data updates the recognition result data (S96). The correction history processing server 116 having received the pen IDs and the character correction result data updates the correction history table (S97). In this case, difference detection becomes necessary in response to the updating, and thus the correction history processing server 116 performs difference detection (S98). The correction history processing server 116 transmits the pen ID and difference detection result data to the character recognition server 111 (S99). The character recognition server 111 having received the pen ID and the difference detection result data updates additional data table corresponding to the pen ID.

Figure 3:
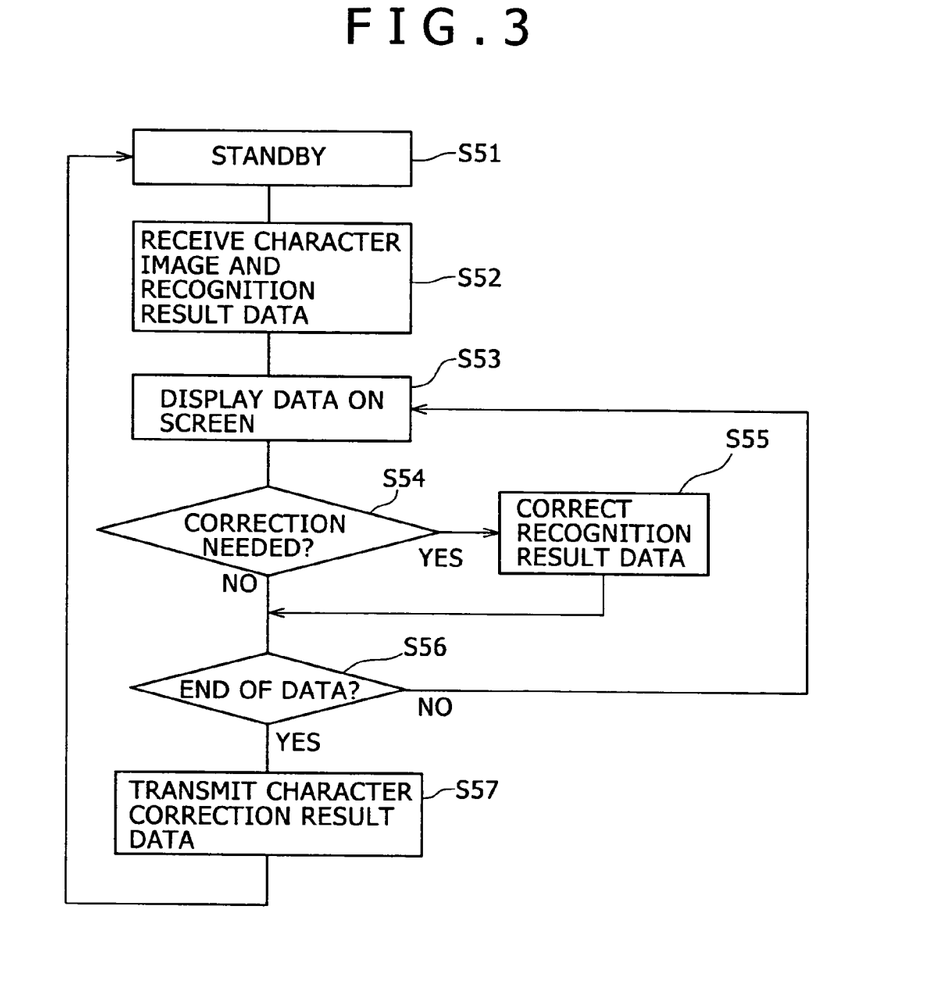
FIG. 3 is a flowchart for explaining operations in a confirmation/correction terminal.

Referring to FIG. 3, the operations of the confirmation/correction terminal will be described below. FIG. 3 is a flowchart for explaining the operations of the confirmation/correction terminal. On standby (S51), when the confirmation/correction terminal 108 receives pen ID, character image data, and recognition result data from the character recognition server 111 (S52), the confirmation/correction terminal 108 displays character images and the recognition result data on a screen (S53) and waits for an operation of the operator (S54). When the operator decides that a correction is necessary, the recognition result data is corrected (S55). When a correction is unnecessary or a correction is completed in step S54, it is decided whether data is left (S56). When data is left, the process returns to step 53 and a confirmation is made on a subsequent screen. When it is decided in step 56 that data is absent, the pen ID and the corrected recognition result data are transmitted to the correction history processing server 116 and the character recognition server 111 (S57), and the process returns to the standby status of step 51.

Figure 9:
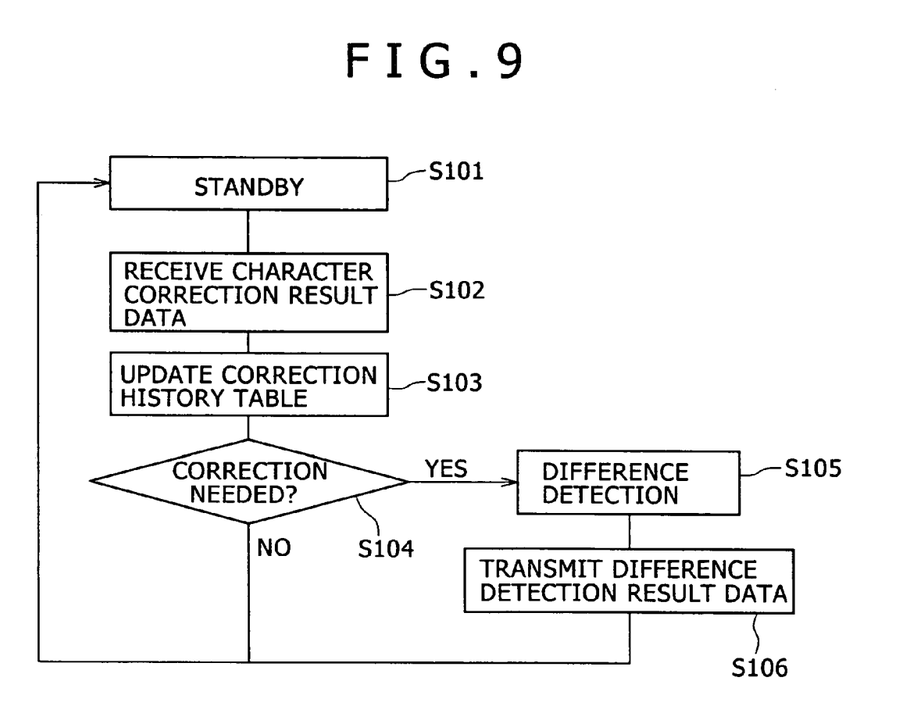
FIG. 9 is a flowchart for explaining the operations of the correction history processing server.

Referring to FIG. 9, the operations of the correction history processing server will be described below. FIG. 9 is a flowchart for explaining the operations of the correction history processing server. On standby (S101), when the correction history processing server 116 receives character correction data from the confirmation/correction terminal 108 (S102), the correction history processing server 116 updates the correction history table (S103). Subsequently, the correction history processing server 116 decides whether or not the additional table of the character recognition server 111 should be corrected (S104). When a correction is necessary, the correction history processing server 116 performs difference detection (S105) and transmits difference detection result data to the character recognition server 111 (S106). When it is decided that a correction is unnecessary in step 104 or step 106 is completed, the correction history processing server 116 returns to the standby status of step 101.

In the explanation of FIGS. 8, 3, and 9, the data among the character recognition server, the confirmation/correction terminal, and the correction history processing server is subjected to batch processing. But the data may be communicated in real time.

Figure 4A:
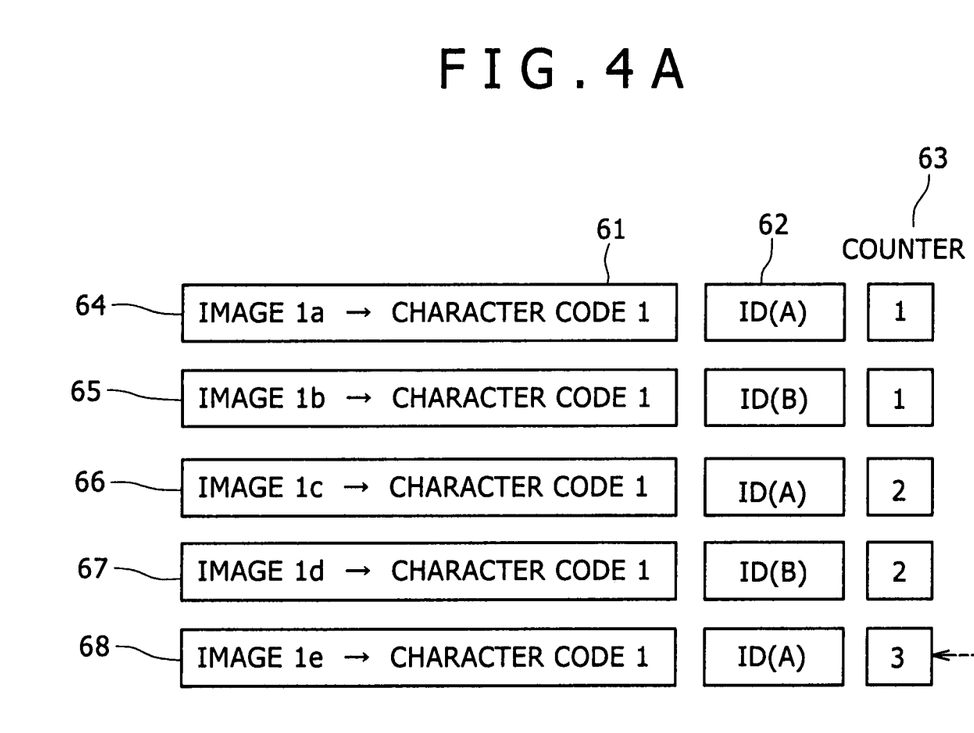
FIG. 4A is a diagram for explaining data stored in a correction history table.
Figure 4B:
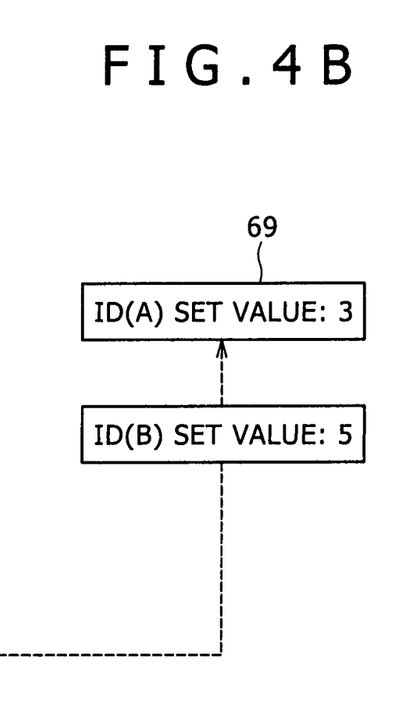
FIG. 4B is a diagram for explaining data stored in a pen ID set value table.

Referring to FIG. 4, the following will explain the correction history table recorded in the storage device 121 connected to the correction history processing server 116, and a pen ID set value table storing the number of corrections for performing difference detection. FIG. 4A is a diagram for explaining data stored in the correction history table. FIG. 4B is a diagram for explaining data stored in the pen ID set value table.

The following explanation is based on the assumption that images 1a, 1b, 1c, 1d, and 1e to be recognized as character code "1" are all recognized as character codes other than character code "1" in the character recognition server. In FIG. 4A, a column 61 indicates correspondences between character image data and a character code corrected in the confirmation/correction terminal. A column 62 indicates pen IDs. To be specific, the images 1a, 1c, and 1e are the corrections of pen ID(A), and the images 1b and 1d are the corrections of pen ID(B). A column 63 indicates counters indicating the number of corrections made on the same combination of the pen ID and the character code.

In FIG. 4B, the set value of the pen ID(A) is 3 and the set value of the pen ID(B) is 5. In FIG. 4A, records 64 to 68 are data arranged in chronological order. In the record 68, the counter value of the pen ID(A) is 3, which is equal to the set value of the pen ID(A) of FIG. 4B. This indicates that a transition is made to difference detection. The counter is reset at the completion of the difference detection.

Data processing for difference detection is performed in the difference detection unit 117 which is a program operating in the correction history processing server 116.

The data of FIG. 4B is stored beforehand in the storage device of the correction history processing server 116. The set value may be set as a varying, predetermined number of corrections for each pen ID and character code. Further, the same value may be set for all pen IDs and other methods may be used to for the setting. When each writer or digital pen used in a business operation has a different number of character image data pieces from which characteristics are easily extracted, a system manager and so on may store necessary set values beforehand in the correction history processing server 116.

Figure 5:
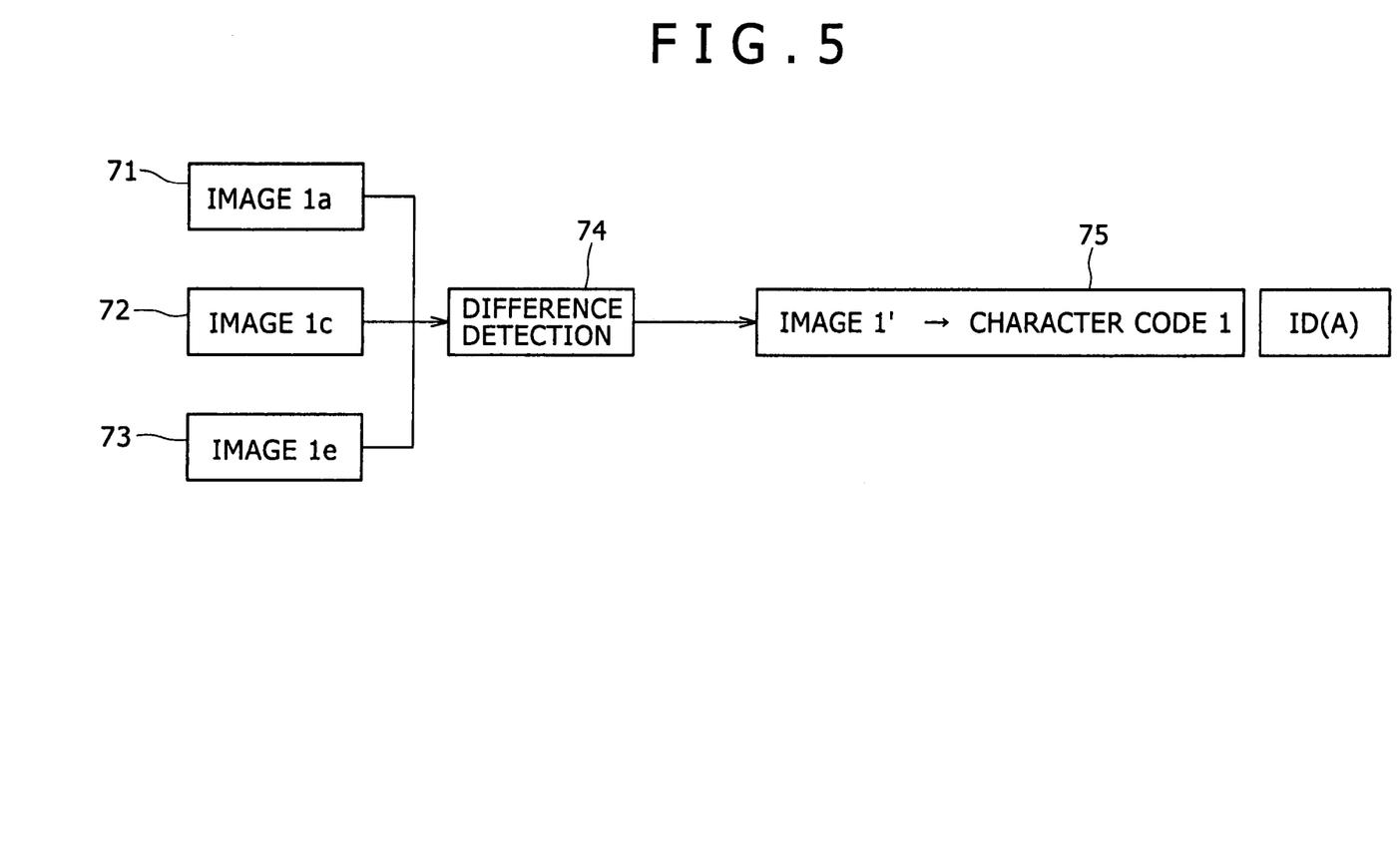
FIG. 5 is a diagram for explaining the flow of difference detection.

FIG. 5 is a diagram for explaining the flow of difference detection.

The difference detection unit 117 serving as a program operating in the correction history processing server 116 extracts from the correction history table 118 an entry including character image data satisfying predetermined conditions and including a character code converted from the character image data, and then the difference detection unit 117 performs difference detection. "Image 1a" 71 of FIG. 5 corresponds to "image 1a" included in the record 64 of FIG. 4. "Image 1c" and "image 1e" establish similar correspondences. The digital pen ID is "ID(A)", the corrected character code is "character code 1", and the number of corrections is "3" in the correction history table 118. Since these conditions are satisfied, the character image data pieces 71 to 73 are extracted from the correction history table 118 as data to be subjected to difference detection.

Difference detection 74 is processing for extracting, from the correction history for each pen ID, data corrected a fixed number of times, and producing new character image data, "image 1'", from character image data changed a fixed number of times. The processing for producing new character image data from extracted character image data will be specifically described later in accordance with FIG. 6.

Reference numeral 75 denotes processing of producing new entry data for the additional table in relation to the pen ID (A) while establishing correspondences among the newly produced image data "image 1'", the character code for recognizing the character image data, and the pen ID. The correction history processing server 116 transmits, to the character recognition server 111, the new entry data to be stored in the additional table 115. The character recognition server 111 receives the data and stores the data in the additional table 115. The difference detection 74 for producing the new "image 1'" will be discussed below in accordance with FIG. 6.

Figure 6:
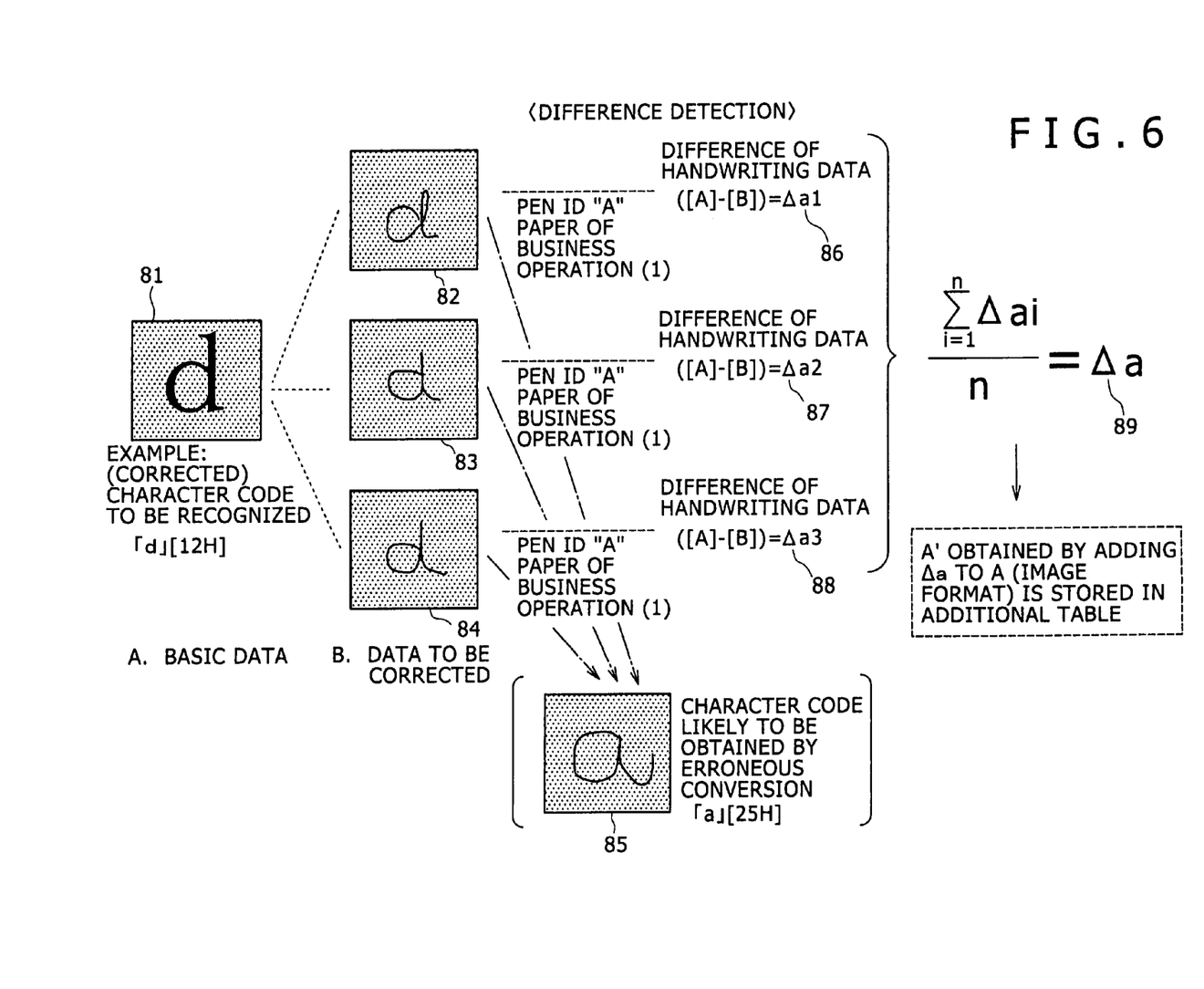
FIG. 6 is a diagram for explaining difference detection.

FIG. 6 is a diagram for explaining difference detection.

Reference numerals 82, 83, and 84 of FIG. 6 denote character image data corresponding to reference numerals 71, 72, and 73 of FIG. 5. The following will discuss processing for producing the new character image, "image 1'" of FIG. 5 from handwritten character image data 82 to 84.

In this case, a handwritten character "d" is erroneously converted into "a" (character code [25H]) three times. A handwritten character image "d" should be correctly converted to text "d" (character code [12H]) but is erroneously converted to text "a" (character code [25H]) because of its characteristic handwriting.

The new character image is produced by extracting differences between basic data and the handwritten character images and using an average value of the differences. As the basic data, the character codes of characters and the coordinate position data on the characters may be stored in relation to each other in the basic table 114, the coordinate position information of characters may be stored for each character font, or other kinds of data may be used.

A difference between the coordinate position of a basic character and the coordinate position of the handwritten character image is determined first (86 to 88).

([A]−[Bi])=Δai

[A]:[coordinate data on characters of basic data]

[Bi]:[coordinate data on characters of handwritten data]

Δai: coordinate data on differences of handwriting data

In the present embodiment, difference detection is performed when a handwritten character image is corrected three times, so that a difference between the basic data and each of the three handwritten character images 82 to 84 is determined (86 to 88). The differential detection unit 117 extracts character images as targets of difference detection from entries stored in the correction history table 118 after every predetermined number of corrections, starting from the latest entry in chronological order.

In the present embodiment, by using a paper sheet on which a dot pattern enabling the recognition of character coordinate positions (pen stroke data) is printed, coordinate positions are detected for a character drawn with the digital pen. Thus, it is possible to obtain coordinate positions (X and Y coordinates) on a trail drawn with the digital pen. What is necessary is to obtain a difference between the basic data and the coordinate position information about the character image data on the digital pen. At the detection of the coordinate positions, coordinate positions may be extracted on the starting point and the end point of a drawn picture, line, or symbol. Alternatively the coordinate position of the intersection of lines may be extracted, all coordinate positions may be detected, or other methods may be used.

Then, an average value of calculated difference data (86 to 88) is determined by formula 89 of FIG. 6. That is, the characteristics of a corrected character image are extracted and an average value is determined, so that data on the characteristics of a handwritten character is obtained. The character coordinate data with the extracted characteristics and the character coordinate data on a character image of the basic data are combined to produce a new character image. In this case, the new character image is "image 1'" included in 75 of FIG. 5.

The correction history processing server 116 adds the pen ID to the newly produced character image as data to be stored in the correction history table 118 and transmits, to the character recognition server 111, the image as data to be stored in the additional table 115. The character recognition server 111 stores the received data in the additional table 115.

The example of FIG. 6 illustrates the character image data. In the case of the difference detection, instead of calculating a difference and the like of handwritten data only with character image data, coordinate position data converted from data on drawn character images may be used for calculation, or other methods may be used. Further, a program and the like for converting character image data to character coordinate position data may be used when necessary.

Figure 7:
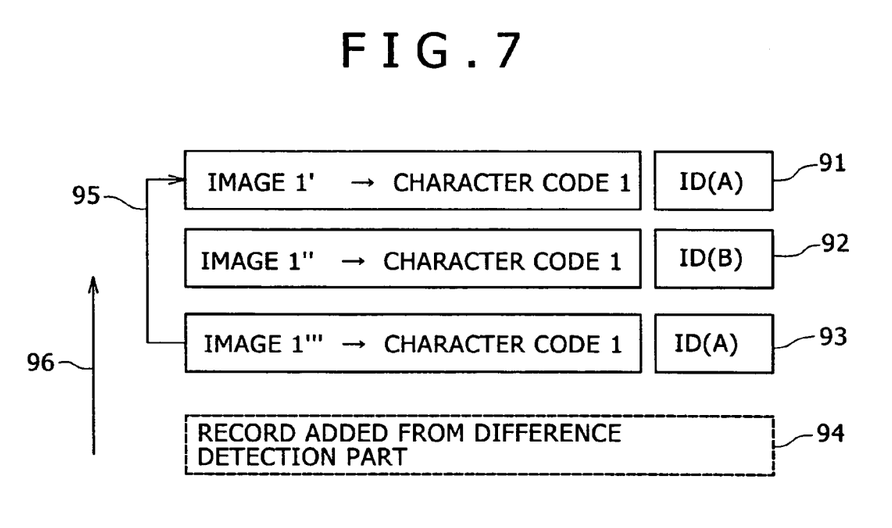
FIG. 7 is a diagram for explaining an additional table 115.

FIG. 7 is a diagram for explaining the additional table 115.

Entries 91 to 93 of the additional table are stored in chronological order. New character image data produced in difference detection, a character code to be recognized in character conversion, and a pen ID of the digital pen are associated with one another and stored in each of the entries.

The character image "image 1'", "character code 1", and the pen ID "ID(A)" are associated with one another and stored in the entry 91. The character image "image 1''", "character code 1", and the pen ID "ID(B)" are associated with one another and stored in the entry 92. The character image "image 1'''", "character code 1", and the pen ID "ID(A)" are associated with one another and stored in the entry 93.

Even when the entries 91 and 92 have different character images, conversion is made to a character code associated with each pen ID. As a result, both of the entries 91 and 92 are recognized as character code 1 and converted as text characters in this example.

The entries 91 and 93 include the same pen ID and the same character code. The entry 93 is newer than the entry 91. In the present embodiment, plural character images are stored in relation to a certain character code. That is, the characteristics of the character are extracted and stored in chronological order.

An arrow 95 indicates a searching method. For example, when character recognition is performed on character image data to which the pen ID "ID(A)" is added, the addition table 115 is searched from the latest entry for a character image to be converted.

Plural entries where character image data, character codes, and pen IDs are associated with one another are stored in the additional table 115. In the present embodiment, data on all the pen IDs is stored in chronological order (96). The entries of each table may be managed with time data. Data is stored in chronological order, so that when the user of the digital pen is changed at some point in time, the manager of the digital pen can delete the data stored in the table or store the data in another file with the user name as past character data used during a fixed period of time.

Instead of management in which character data and character codes are associated with each other for all the pen IDs in one additional table, the additional table 115 may be provided for each pen ID or other methods may be used.

It is only necessary to store the additional table 115 in a recording medium or storage device accessible from the character recognition server 111, and thus the additional table 115 is not limited to the example illustrated in FIG. 1. For example, the additional table may be stored in the storage device of the digital pen 101 and the storage device of the data transfer PC 106.

A program for performing correction history processing of character data in the present embodiment, wherein information is received in which a device identifier, character image data, and a corrected character code are associated with one another, the received information is stored as a new entry in a correction history table, it is decided whether or not each entry included in the correction history table satisfies a predetermined condition, plural character image data pieces are extracted from entries included in the correction history table according to a result of the decision, new character image data is produced by performing difference detection on the extracted character image data, and information in which the new character image data, the corrected character code, and the device identifier are associated with one another is transmitted to another program.

A character recognition system of the present embodiment including an input device having a unique identifier and including a data transmission unit, a character recognition server, a storage device for storing a table required for character recognition, a server for processing a correction history, and a correction terminal, wherein the input device transmits, to the character recognition server, the identifier unique to the input device and data on the coordinate positions of handwritten character data in relation to each other.

The character recognition server converts the transmitted data on the coordinate positions of the handwritten character data to handwritten character image data, and transmits, to the correction terminal, the converted character image data, the identifier unique to the input device, and a character code in relation to one another.

The correction terminal corrects character code data associated with the transmitted character image data, and transmits, to the correction history processing server, the corrected character code, the received character image data, and the identifier unique to the input device in relation to one another.

The correction history processing server establishes correspondences among the transmitted character image data, the corrected character code, and the identifier unique to the input device, and stores the data and the code as a new entry in the correction history table. In the case where the correction history table has entries including the transmitted character code and the same value as the identifier unique to the input device, when the correction history table has a predetermined number of the entries, character image data included in the entries is extracted, new character image data is produced by performing difference detection on the extracted character image data, and information in which the new character image data, the corrected character code, and the device identifier are associated with one another is transmitted to the character recognition server.

The character recognition server stores, in the additional table, the transmitted information in which the new character image data, the corrected character code, and the device identifier are associated with one another, and performs character recognition on the additional table.

As described above, according to the present embodiment, the characteristics of a character is extracted from the coordinate positions of a trail of the digital pen. Thus, even when the stroke order of the character is wrong, it is possible to recognize the character from drawn position information and extract its characteristics.

Further, according to the present embodiment, information in which all character images are corrected is stored in the correction history table 118 in chronological order, the characteristics of the character images are extracted under certain conditions, starting from the latest correction data, and then addition and updating are performed on the additional table 115. Thus, it is possible to recognize the current characteristics of a character as well as its characteristics registered in the past.

That is, in the present embodiment, the following processing is repeated under specific conditions (e.g., the number of corrections, a corrected character code, and so on): regarding correction history associated with a specific device ID, characteristics are extracted in chronological order from correction history information starting from the latest correction data. Hence, data on characteristics extracted under the specific conditions is added and stored in the additional table. In this way, character recognition is performed using the additional table where the characteristics of characters are accumulated under these conditions, achieving finer character recognition.

The present embodiment provides the additional table without updating the basic table and character recognition is performed in order of priority according to a device ID, thereby increasing a character recognition rate.

Conversely, it is possible to prevent the update of the basic table from degrading a character recognition table.

The present embodiment makes it possible to capture the characteristics of handwriting for each device ID. Moreover, data on extracted handwriting characteristics and the data on basic information for character recognition are separately managed and used in relation to the device ID, thereby increasing a character recognition rate.

What is claimed is:

1. A character recognition method performed by a character recognition device, comprising the steps of:
   receiving information in which a device identifier, character image data, and a corrected character code are associated with one another,
   storing the received information as a new entry in a correction history table,
   deciding whether or not information of each entry included in the correction history table satisfies a predetermined condition,
   extracting a plurality of character image data pieces from the entries included in the correction history table according to a result of the decision,
   producing new character image data by performing difference detection on the extracted character image data, and
   storing, in an additional table, information in which the new character image data, a character code, and a device identifier are associated with one another,
   deciding whether or not the additional table has a device identifier received with a character recognition instruction when receiving information in which the device identifier and character image data are associated with each other as well as the character recognition instruction,
   performing character recognition based on the additional table when it is decided that the additional table has the device identifier received with the character recognition instruction, and
   performing character recognition, when it is decided that the additional table does not have the device identifier received with the character recognition instruction, based on a basic table storing an entry in which predetermined character image data and a character code are associated with each other.

2. The character recognition method according to claim 1, wherein the predetermined condition is that the correction history table has a plurality of entries including the same device identifier and character code as the received device identifier and the received corrected character code.

3. The character recognition method according to claim 1, wherein in the difference detection, a difference is determined between coordinate data on character image data included in the basic table storing an entry in which predetermined character image data and a character code are associated with each other and coordinate data on a plurality of character image data pieces extracted from the correction history table,
   coordinate data is determined for an average value of coordinate data on the determined difference, and
   the determined coordinate data on the average value and the coordinate data on the character image data included in the basic table are combined.

4. A character recognition system comprising an input device having a unique identifier and including a data transmission unit, a character recognition server, a storage device for storing a table required for character recognition, a server for processing a correction history, and a correction terminal,
   wherein the input device transmits, to the character recognition server, the identifier unique to the input device and data on coordinate positions of handwritten character data in relation to one another,
   the character recognition server converts the transmitted data on the coordinate positions of the handwritten character data into handwritten character image data, and transmits, to the correction terminal, the converted character image data, the identifier unique to the input device, and a character code in relation to one another,
   the correction terminal corrects character code data associated with the transmitted character image data, and transmits, to the correction history processing server, the corrected character code, the received character image data, and the identifier unique to the input device in relation to one another,
   the correction history processing server establishes a correspondence among the transmitted character image data, corrected character code, and identifier unique to the input device, and stores them as a new entry in the correction history table,
   in a case where the correction history table has entries including the transmitted character code and the same value as the identifier unique to the input device, when the correction history table has a predetermined number of the entries, character image data included in the entries is extracted,
   new character image data is produced by performing difference detection on the extracted character image data,
   information in which the new character image data, the corrected character code, and the device identifier are associated with one another is transmitted to the character recognition server, the character recognition server stores, in an additional table, the transmitted information in which the new character image data, the corrected character code, and the device identifier are associated with one another, and the additional table is used to perform character recognition.

* * * * *